US008635343B2

(12) United States Patent
Tuohino et al.

(10) Patent No.: US 8,635,343 B2
(45) Date of Patent: *Jan. 21, 2014

(54) METHOD AND ELEMENT FOR SERVICE CONTROL

(75) Inventors: Markku Tuohino, Espoo (FI); Ilkka Westman, Helsinki (FI)

(73) Assignee: Nokia Corporation, Espoo (FI)

( * ) Notice: Subject to any disclaimer, the term of this patent is extended or adjusted under 35 U.S.C. 154(b) by 501 days.

This patent is subject to a terminal disclaimer.

(21) Appl. No.: 12/958,285

(22) Filed: Dec. 1, 2010

(65) Prior Publication Data

US 2011/0078316 A1 Mar. 31, 2011

Related U.S. Application Data

(63) Continuation of application No. 11/189,818, filed on Jul. 27, 2005, now Pat. No. 7,870,262.

(30) Foreign Application Priority Data

May 13, 2005 (FI) ...................................... 20055226

(51) Int. Cl.
G06F 15/16 (2006.01)

(52) U.S. Cl.
USPC ............ 709/227; 709/203; 709/228; 709/238

(58) Field of Classification Search
USPC .................................. 709/203, 227, 228, 238
See application file for complete search history.

(56) References Cited

U.S. PATENT DOCUMENTS

| | | | |
|---|---|---|---|
| 5,603,029 A | 2/1997 | Aman et al. | |
| 6,115,600 A | 9/2000 | Tuohino et al. | |
| 6,181,938 B1 | 1/2001 | Salmela et al. | |
| 6,640,097 B2 | 10/2003 | Corrigan et al. | |
| 6,789,118 B1 | 9/2004 | Rao | |
| 6,889,385 B1 | 5/2005 | Rakib et al. | |

(Continued)

FOREIGN PATENT DOCUMENTS

| | | |
|---|---|---|
| EP | 1880556 A1 | 1/2008 |
| JP | 11340984 A | 12/1999 |

(Continued)

OTHER PUBLICATIONS

Rosenberg et al., "Indicating User Agent Capabilities in the Session Initiation Protocol (SIP)", RFC 3840, Aug. 2004.

(Continued)

*Primary Examiner* — Phuoc Nguyen
(74) *Attorney, Agent, or Firm* — Mintz, Levin, Cohn, Ferris, Glovsky & Popeo, P.C.

(57) ABSTRACT

A service control element stores a user filter criterion. When it receives a session request identifying the user, it checks whether the session request matches the user filter criterion, and outputs the session request to a defined service platform when the session request matches the user filter criterion. The element is arranged to retrieve, before forwarding the request to the service platform, a capability information element that indicates the dynamic capability of a user to utilize the service provided by the service platform. If the information element indicates that the user is not capable to utilize the service provided by the service platform, the session is terminated. Incoming messages can be appropriately managed already in the network element responsible for service control, and thus additional load and unnecessary charging considerations can be avoided.

18 Claims, 3 Drawing Sheets

(56) References Cited

U.S. PATENT DOCUMENTS

| | | |
|---|---|---|
| 7,225,220 B2 | 5/2007 | Gonzalez et al. |
| 7,870,262 B2 | 1/2011 | Tuohino et al. |
| 2003/0035401 A1 | 2/2003 | Shaheen et al. |
| 2003/0229699 A1* | 12/2003 | Moran et al. ............... 709/227 |
| 2005/0182852 A1 | 8/2005 | Tinsley et al. |
| 2005/0193114 A1 | 9/2005 | Colby et al. |
| 2005/0210138 A1* | 9/2005 | Zigmond et al. ............ 709/227 |
| 2009/0279701 A1* | 11/2009 | Moisand et al. ............ 380/270 |

FOREIGN PATENT DOCUMENTS

| | | |
|---|---|---|
| JP | 2000253143 A | 9/2000 |
| JP | 2003-067296 A | 3/2003 |
| WO | WO-02/078362 A1 | 10/2002 |
| WO | WO-2004088950 A1 | 10/2004 |
| WO | WO-2005018200 A1 | 2/2005 |
| WO | WO-2006120303 A1 | 11/2006 |

OTHER PUBLICATIONS

English translation of the first Office Action dated Jan. 18, 2010, issued by the Indonesia Directorate General of the Intellecutal Property Rights, in connection with counterpart Indonesian patent application No. W-00200703885.

"Digital Cellular Telecommunications System (Phase 2+); Universal Mobile Telecommunications System (UMTS); IP Multimedia (IM) session handling; IM call model; Stage 2 (3GPP TS 23.218 version 6.3.0, Release 6); ETSI TS 123 218", Mar. 1, 2005.

* cited by examiner

METHOD AND ELEMENT FOR SERVICE CONTROL

CROSS REFERENCE TO RELATED APPLICATION

This application is a continuation application of U.S. patent application Ser. No. 11/189,818, filed on Jul. 27, 2005 now U.S. Pat. No. 7,870,262 entitled "METHOD AND ELEMENT FOR SERVICE CONTROL,", which claims the benefit under 35 U.S.C. §119 of Finland Patent Application No. 200552266, filed May 13, 2005, contents of the aforementioned applications are hereby incorporated by reference herein in their entirety.

FIELD OF THE INVENTION

The present invention relates to multimedia systems, and especially to a service control element, a method, a subscriber server and a computer program product according to the preambles of the independent claims.

BACKGROUND OF THE INVENTION

During the development of 2G mobile systems, complete sets of networks, teleservices, applications and supplementary services were ubiquitously specified by standardization bodies. A common interest of the industry has, however, been to shorten the specification time of service enablers, fasten the introduction of new services and enable seamless scalability of services. At 3G development, the approach has thus been focused to standardizing service capabilities, instead of the services per se.

ETSI (European Telecommunications Standards Institute) defines service control as an ability of a user, home environment or serving environment to determine what a particular service does, for a specific invocation of that service, within the limitations of that service. Basically this means that the architecture of any system should provide a service framework that facilitates appropriate security, quality of service, charging, and session management to support the various services within that system. Initially a number of service enablers, like digital rights management and push to talk over cellular (PoC) service, used to generate service control models more or less independently, merely as a response to the clear customer need. Later, different services enablers have been co-operating under a global organization called the Open Mobile Alliance (OMA) to utilise an infrastructure that provides the required basic capabilities.

For the time being, the infrastructure is called the Internet Protocol Multimedia Subsystem (IMS). It relates to an access-independent IP-based architecture that interworks with existing voice and data networks accessible by both fixed and mobile users. The IMS architecture facilitates peer-to-peer IP communication with various types of clients with the requisite quality of services. The IMS is based on the specification of the Session Initiation Protocol (SIP) as standardised by the Internet Engineering Task Force (IETF). So called Release 5 introduced IMS as part of 3GPP standards. A number of IMS specifications are made publicly available by 3GPP and OMA.

A session relates to an interval during which a logical correspondence between two objects exists for the transfer of related information. A session can include, for example, transmission of voice or video data. In IMS, the selected application-layer control protocol for creating, modifying, and terminating sessions with one or more participants is Session Initiation Protocol (SIP). Users may have several connections to different service applications during a session. For each IMS session, the service control of IMS maintains a session state, interacts with service platforms and charging functions as required by the service. The logical network element responsible for these functions is called the Serving Call Session Control Function (S-CSCF).

In the IMS architecture, services are hosted and executed in service platforms, Application Servers (AS). For sending and receiving SIP messages between the S-CSCF and AS an IMS Service Control reference point (ISC) is defined between the S-CSCF and AS. When the S-CSCF receives a SIP request, it will analyze it and decide to route the request to an AS for further processing. The analysis is based on a service profile associated with a public user identity indicated in the request. The service profile relates to a collection of user-specific information (e.g. filter criteria) that is made available to the S-CSCF at least during the time the S-CSCF performs data handling operations of that particular user. Typically the service profile or at least the filter criteria are downloaded to S-CSCF on user registration or when a terminating initial request is received for an unregistered user.

A service profile of an IMS subscription comprises filter criteria that describe one or more conditions that are checked to decide whether an incoming SIP message should be further routed to an AS for further processing. The filter criteria also specify the particular AS to be contacted whenever the conditions are met. A filter criterion thus represents a provisioned subscription of a user to an application or applications.

The capability of a user agent (UA) to utilize a provisioned application may, however, change dynamically. According to RFC 3840, a capability is defined as an attribute of a sender or receiver that indicates an ability to generate or process a particular type of message content. A capability is distinct from a characteristic in that a capability may or may not be utilized in any particular period, for example during a single call, whereas a characteristic is a non-negotiable property of a UA. For example, user agents may vary widely in their capabilities and in the type of devices they represent. Filter criteria is, however, a substantially static definition that does not facilitate dynamic variations caused by, for example, the capability of the current terminal equipment in use.

For example, an IMS user may have been subscribed to use a PoC service, but has currently not registered as a PoC user, because he or she is presently using a terminal without PoC capability. When an incoming request addressed to that IMS user is received by S-CSCF, S-CSCF analyzes the request and compares it against the filter criteria. The filter criteria state that if the request comprises PoC service capability indication, the message has to be forwarded to a defined PoC AS. IMS service control naturally comprises a mechanism whereby AS may detect the mismatch and appropriately terminate the session initiation. However, at that time the routing has already proceeded all the way to the AS. This adds superfluous load to the PoC server and, depending on the answer mode setting within the PoC server, may generate charging activities that need to be agreed and arranged separately, for example the charging records have to be cancelled/revoked. Furthermore, this is a severe technical drawback that compromises the acceptance and implementation of services in IMS systems.

BRIEF DESCRIPTION OF THE INVENTION

An object of the present invention is to provide a service control element, a method, a subscriber server and a computer program product so as to improve handling of sessions where various terminal capabilities are utilized. The objects of the invention are achieved by a service control element, a method, a subscriber server and a computer program product, which are characterized by what is stated in the independent claims. The preferred embodiments of the invention are disclosed in the dependent claims.

The invention is based on the idea of providing a service control where a dynamic capability of a user agent to utilize a service is made as a criterion for deciding whether an incoming request is forwarded to an application server of that particular application.

An advantage of the invention is that incoming messages can be appropriately managed already in the network element responsible for service control, and thus unnecessary charging considerations can be avoided, and additional signalling load on the servers providing the service can be avoided.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The present invention is applicable to different access-independent packet based multimedia architectures that interwork with, for example, voice and data networks for fixed (PSTN, ISDN, Internet) and mobile users (GSM; CDMA; WCDMA), and comprise service control that facilitates establishment of peer-to-peer communications with various types of clients. Examples of such systems comprise 3GPP IMS, 3GPP2 MMD (Multi-Media Domain), IETF SIP networks, SIP networks in general or ETSI TISPAN NGN networks which can have various type of access networks, e.g. GERAN, UTRAN, WLAN, Fixed Broadband access, and in fixed-mobile case also PSTN/ISDN access networks. In the following, the invention is illustrated by means of IMS and PoC service without, however, limiting the invention to the terms, protocols and logical elements used herein.

Figure 1:
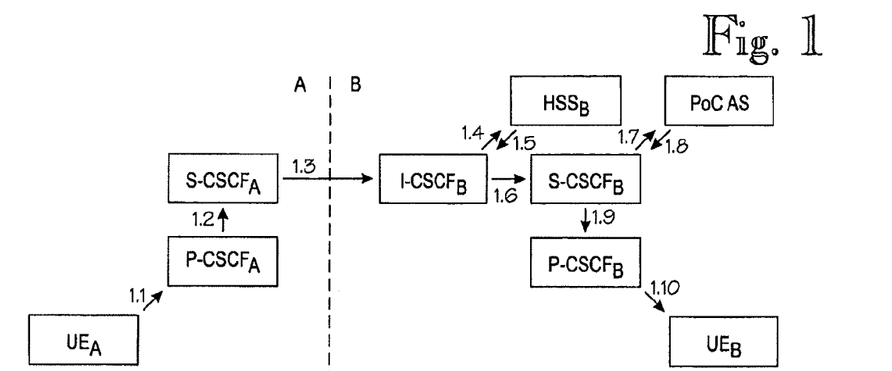
FIG. 1 shows a signalling block chart that illustrates information flows between IMS elements in a high-level IMS session establishment.

FIG. 1 shows a signalling block chart that illustrates information flows between IMS elements in a high-level IMS session establishment. It should be noted that for clarity only logical IMS elements necessary for describing the invention are shown in FIG. 1. For a person skilled in the art it is clear that a complete network for performing the required data transmission comprises a number of conventional subnetworks and network elements that need not be shown for the purpose of comprehending the invention. Furthermore, individual elements of FIG. 1 relate to functional division of the operations and do not, as such, imply a physical configuration of the elements. Some shown logical elements may be integrated to one physical structure, and/or some elements may be physically divided into two or more separate physical configurations.

A user equipment UE can be a simplified terminal for speech only or it can be a terminal for diverse services acting as a service platform and supporting the loading and execution of various functions related to the services. In this context, the term user equipment generally refers to the entity formed by the subscriber identity and the actual mobile equipment. A mobile user equipment in the following embodiments comprises an actual mobile equipment and a detachably connected subscriber identity module, without limiting the scope of protection to such configuration only. It is clear that some user equipment, for example fixed terminals for broadband access, do not comprise a separate identity module. The subscriber identity module is typically a smart card that substantially holds the subscriber identity, performs authentication algorithms, and stores authentication and encryption keys and other subscription information that is needed at the user equipment. The mobile equipment is typically a radio terminal used for radio communication between the user equipment and the network. The mobile equipment may be any equipment capable of communicating in a mobile communication system or a combination of several pieces of equipment, for instance a multimedia computer to which a phone has been connected to provide a mobile connection.

An IMS user has one or more public user identities that are used by any user for requesting communications to other users. The public user identity/identities typically take the form of SIP-URI or TEL-URI (tel URL) format. A Public User Identity typically needs to be registered either explicitly or implicitly before the identity can be used to participate in IMS sessions and IMS session unrelated procedures. In some cases such registration is, however, done with other means, for example with static (permanent, semi-permanent) registration when the user equipment is connected to a fixed line.

When an originating user A wants to make a PoC call to a terminating user B, a user equipment of user A ($UE_A$) generates a SIP INVITE request (step 1.1), includes in the Accept-Contact Header of the request a PoC feature tag "+g.poc.talkburst", and sends the request to a Proxy-Call Session Control Function ($P\text{-}CSCF_A$). $P\text{-}CSCF_A$ represents the first contact point of $UE_A$ within IMS. If the request is compressed, $UE_A$ decompresses the request, verifies the identity of the originating user A, and forwards the request (step 1.2) to the Serving Call Session Control Function ($S\text{-}CSCF_A$) of the home network of user A. $S\text{-}CSCF_A$ is responsible of the session control and registration services for the user equipment. Whenever user equipment is engaged in a session, $S\text{-}CSCF_A$ maintains a session state and interacts with service platforms in order to support the services.

$S\text{-}CSCF_A$ processes the request, performs service control and, on the basis of the terminating user's identity in the SIP INVITE request, determines an entry point of the home operator of user B. The Interrogating Call Session Control Function ($I\text{-}CSCF_B$) is a contact point within one network for connections addressed to a subscriber of that network operator. S-CSCF sends (step 1.3) the SIP INVITE request to $I\text{-}CSCF_B$, which interacts (steps 1.4 and 1.5) with the Home Subscriber Server (HSS$_B$) of the home operator of user B to determine the S-CSCF$_B$ that is serving the user equipment of user B (UE$_B$). Having received the request (step 1.6) S-CSCF$_B$ takes charge of processing a terminating session.

In case UE$_B$ is not registered, S-CSCF$_B$ downloads from the Home Subscriber Server (HSS$_B$) of the home operator of user B the filter criteria associated with the target identity of the received request, if necessary. In case UE$_B$ is registered, the filter criteria is readily available for S-CSCF$_B$. S-CSCF$_B$ begins to go through these filter criteria one by one, checking whether any of the criteria match the parameters in the received request. In a simplified form, the filter criteria associated with the identity may state, for example:
CASE method="INVITE" AND header="Accept-Contact"="+g.poc.talkburst" THEN: ROUTE request to the specified PoC Server Terminating Port Since the filter criterion matches with the request, S-CSCF$_B$ forwards the request (step 1.7) to PoC AS. It should be noted that the presented filter criterions relate to examples and comprise only elements necessary to illustrate the present embodiment of the invention. For a person skilled in the art it is clear, for example, that a filter criterion may be in other format and comprise other elements not shown in the illustrated example. PoC AS implements the service logic according to the PoC service and routes the INVITE request back (step 1.8) to S-CSCF$_B$. S-CSCF$_B$ delivers the request (step 1.9) to P-CSCF$_B$ that finally delivers the request to UE$_B$. The user equipment UE$_A$ and UE$_B$ will exchange end-to-end some additional data for completing the session establishment, and the PoC call may begin.

Figure 2:
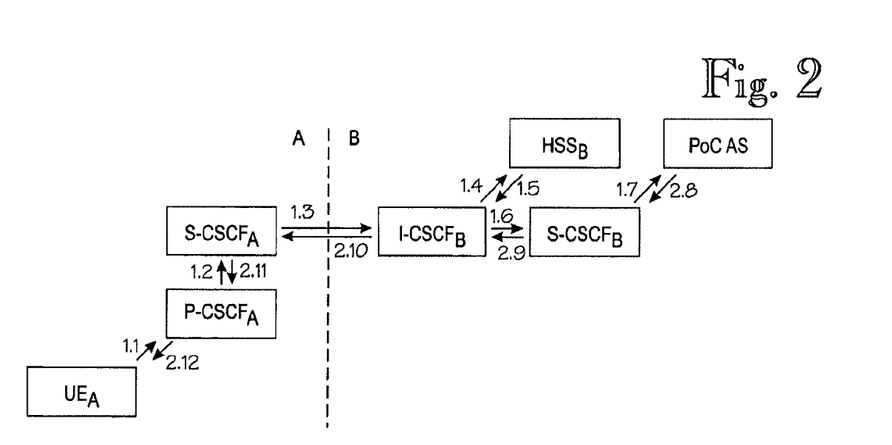
FIG. 2 illustrates a signalling block chart when a terminating user equipment has re-registered to IMS without a PoC capability.

FIG. 1 relates to a normal case where no mismatch between the provisioned application and the capability of the user equipment is detected. FIG. 2 illustrates the situation where UE$_B$ has re-registered to IMS but, for example, in order to indicate that the user does not want to receive any PoC sessions, has not included indication of the PoC capability in the registration. The incoming request is forwarded to the PoC AS in a similar manner as in steps 1.1 to 1.7 of FIG. 1.

At this stage PoC AS may detect a mismatch due to the PoC feature tag "+g.poc.talkburst" in the request and the indicated capability/ies of the terminating user equipment UE$_B$, provided that the indicated capability/ies of the terminating user equipment UE$_B$ is/are available in the PoC AS. If the PoC AS detects the mismatch it, according to its service logic, terminates the session initiation and sends (steps 2.8 to 2.12) an appropriate error message to the originating user equipment UE$_A$. If PoC AS does not detect the mismatch, it processes the request and forwards it to S-CSCF for further routing towards UE$_B$. Before routing towards UE$_B$ S-CSCF checks the indicated capabilities of UE$_B$ and detects the mismatch. If S-CSCF detects the mismatch, it terminates the session initiation and sends an appropriate error message to the originating user equipment UE$_A$.

The operations towards and in PoC AS cause additional signalling load to the PoC server and/or S-CSCF, which at least in a congested system needs to be carefully avoided. The operations also generate one or more call detail records that in a normal session may be used as a basis for charging the subscriber. Such superfluous involvement with charging related information generates cumulative workload that needs to be eliminated.

Figure 3:
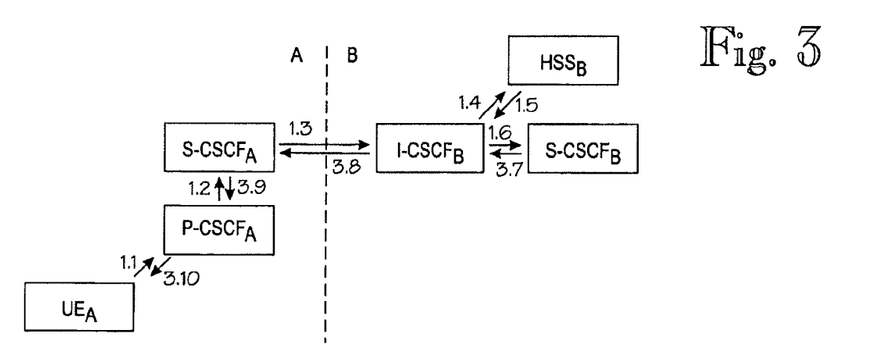
FIG. 3 illustrates the situation of FIG. 2 but at this time improved with the invented solution.

FIG. 3 illustrates the situation of FIG. 2 but at this time improved with an embodiment of the invented solution. The request is forwarded to the S-CSCF in a similar manner as in steps 1.1 to 1.6 of FIG. 1. At this stage the S-CSCF detects a service control criterion, herein illustrated by means of a filter criterion:

CASE method="INVITE" AND header="Accept-Contact"="+g.poc.talkburst" AND Contact header of the REGISTER request included '+g.poc.talkburst' THEN: ROUTE request to the specified PoC Server Terminating Port Since not all of the ANDed conditions of the above filter criterion are met (i.e. the registered Contact header of UE$_B$ does not include the Poc feature tag '+g.poc.talkburst), the request is not forwarded to PoC AS, but instead returned (steps 3.7 to 3.10) to the originating user equipment UE$_A$ with appropriate error code. The mismatch gets thus detected before ending up to the PoC AS, and the improper operation is eliminated.

It should be noted that the filter criterion used in the description of the current embodiment serves merely as an example of service control criteria and is used to address the essential logical content necessary for illustrating the invention. For a person skilled in the art it is clear that any kind of set of references against which other things can be evaluated in order to control access to a service provided by the service platform is applicable. Additionally, a REGISTER request itself or the necessary part or information from it may be stored at any registration event, for example at registration, re-registrations or de-registration. Furthermore, the invention is valid for requests (e.g. SIP INVITE) as well as for standalone transactions (e.g. SIP MESSAGE).

The type of the filter criterion corresponds with the request in question. For example in IMS normally only initial filter criteria are evaluated when initial request is handled and subsequent filter criteria are evaluated when subsequent request is handled. System filter criteria may be used to define filter criteria common to one or more users.

Figure 4:
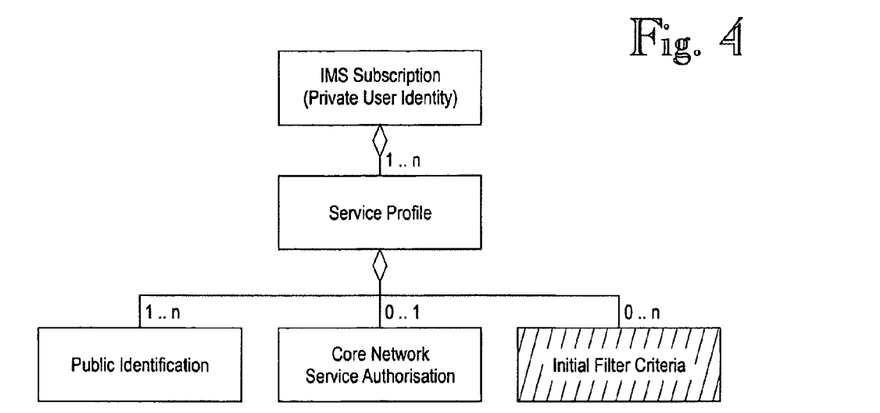
FIG. 4 illustrates a user profile associated with an IMS subscriber.

FIG. 4 illustrates a user profile associated with an IMS subscriber, according to the embodiment of the present invention. When a user obtains an IMS subscription, he or she is assigned a user profile. The user profile comprises at least one private user identity 40 and single service profile 41. A user profile may have more than one private user identity (allows multiple registered Contact addresses), and one IMS subscription may contain multiple service profiles. The service profile comprises a public identification 42, core network service authorization 43, and filter criteria part 44. The public identification 42 includes public user identities (SIP uniform resource identifiers (URI) or tel URIs) that are associated with the service profile. Core network service authorization 43 may carry media policy information that allows operators to provide different subscriber profiles in their IMS networks.

The filter criteria 44 presents service triggering information that describes when an incoming SIP message is further routed to a specific application server. According to the invention, the filter information is arranged to allow checking of the dynamic capability of the associated user equipment to utilize the service provided by the application server. In the present embodiment the user indicates the PoC capability by including the media feature tag "+g.poc.talkburst" to the request at registering to IMS.

Figure 5:
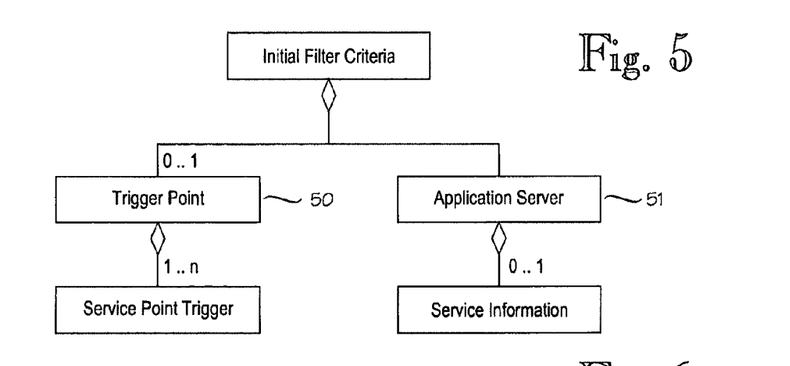
FIG. 5 illustrates in more detail the structure of the filter criteria.

FIG. 5 illustrates in more detail the structure of a filter criterion. The filter criterion comprises zero or one instance of trigger points 50, and one instance of an application server 51. Filter criteria may be mutually prioritized by means of priority numbers, and then assessed in the priority order. The application server 51 specifies the AS that is contacted whenever the filter criterion is met. The application server 51 may also comprise service information that is transferred transparently through S-CSCF to AS when the conditions of filter criteria are met during registration.

The trigger point 50 specifies conditions that are checked to discover whether AS indicated by the application server 51 should be contacted in IMS. According to the invention, the trigger point is arranged to comprise information on the dynamic capability of the associated user equipment to utilize the service provided by the application server 51. In the present embodiment the trigger point prompts S-CSCF to check whether the terminating user equipment has indicated PoC capability by including the media feature tag "+g.poc-.talkburst" to the request at registering to IMS.

Figure 6:
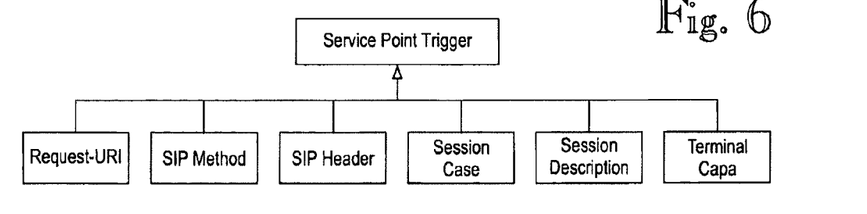
FIG. 6 illustrates in more detail the structure trigger point of FIG. 5.

FIG. 6 illustrates in more detail the structure of a trigger point 50. The trigger point comprises one or more instances of a service point trigger (SPT) 60. SPT 60 instances according to the present embodiment comprise:

Request-URI for identifying a resource that the request is addressed to

SIP method for indicating the type of request

SIP header for providing data related to the request, for example, for triggering on the presence or absence of any SIP header or for triggering on the content of SIP header(s)

Session case for indicating if the filter should be used by the S-CSCF of the originating or the terminating user Session description for defining a SPT for the content of any SDP field within the body of a SIP method.

Registered Contact/terminal capability for indicating, according to the present embodiment, the dynamic capability of the associated user to utilize the service provided by the application server.

In another embodiment of the invention, a capability information element that checks the dynamic capability of the user equipment to utilize a particular service is not made part of the user's filter criteria, but instead stored at the registration or before the registration in S-CSCF or in a database, file, list, table or alike, or on the level of system filter criteria common to one or more users, and applied before routing to AS, for example in connection with the filter criteria evaluation. This is illustrated by means of FIG. 7, referring to the connection type and elements discussed in FIG. 1. In step 710, S-CSCF receives a request and takes charge of processing a session that terminates to its user $UE_B$. In step 715, S-CSCF checks whether $UE_B$ is registered. In case $UE_B$ is not registered, S-CSCF downloads (step 720) from the Home Subscriber Server ($HSS_B$) of the home operator of user B the filter criteria associated with the identity received in the request. In case $UE_B$ is registered, the filter criteria is readily available for the S-CSCF. S-CSCF begins to go through these filter criteria one by one, checking whether any of the criteria match the received request (step 725). For any match, S-CSCF implements (step 730) the related service logic according to a pre-defined priority order between the services.

Figure 7:
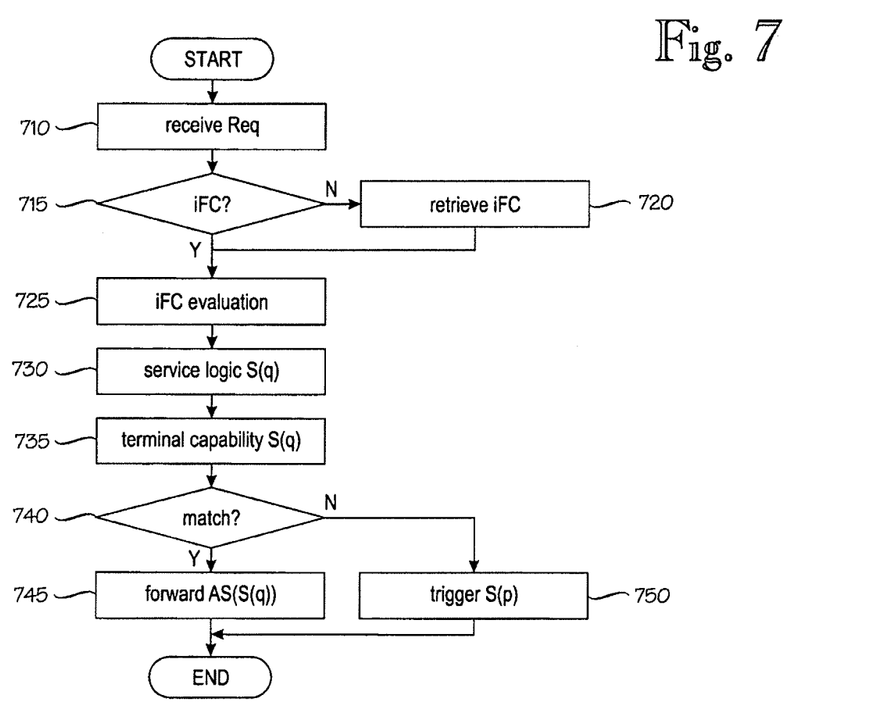
FIG. 7 shows a flow chart illustrating operation of a service control element of a terminating user equipment.

According to the embodiment, for at least one service S(q), but preferably for all the matching services, the S-CSCF also checks (step 735) whether there is any Contact/terminal capability information related to that particular service S(q) available. For example, in the case of PoC service, S-CSCF is arranged to check whether the user equipment $UE_B$ is registered and, and if yes, whether the PoC feature tag was received at registration. In case there is a match (step 740) between the service S(q) and the terminal capability information stored in S-CSCF, S-CSCF continues the service logic of the service S(q) as originally stated. For example, in the exemplary embodiment of FIG. 1, in case the PoC capability information received during the registration of $UE_B$ matches the PoC feature tag in the request, the INVITE request is forwarded to PoC AS. Otherwise S-CSCF is arranged to implement an alternative functionality F(q). In the present case, S-CSCF terminates the session and forwards an appropriate error message to the originating user equipment $UE_A$. It is clear to a person skilled in the art that the functionality F(q) following a mismatch in the terminal capability and the incoming request may be set according to the application. For example, it may be set that in case of mismatch, S-CSCF is arranged to request the terminal capability/capabilities from $UE_B$ before it forwards the request to the AS of service S(q).

For a person skilled in the art it is clear that within the scope of protection there are several alternatives for the information on the available capabilities to exist. Correspondingly the checking whether a request (e.g. a SIP initial session request or a SIP standalone transaction) should or should not be routed to the service platform is not limited to the filter criteria assessment, but may be based on any session control condition, session activity, session action or the like. In the following there are examples of some alternative procedures. It should be noted that the filter criteria serve as an example, and for simplicity, only essential parts of the filter criteria are shown.

CASE method="INVITE" AND header="Accept-Contact"="+g.poc.talkburst" THEN: ROUTE request to the specified PoC Server Terminating Port 1. At registration of a user equipment, the filter criteria are edited to contain terminal capabilities. For example, the content of the Contact header of the REGISTER request may be copied to the filter criteria. The filter criteria thus comprise:

CASE method="INVITE" AND header="Accept-Contact"="+g.poc.talkburst" AND '+g.poc.talkburst' is included in "aaa:bbb:ccc::335:444:555;+g.poc.talkburst" THEN ROUTE request to the specified PoC Server Terminating Port 2. At registration of a user equipment, the filter criteria are edited to contain terminal capabilities. For example, the content of the Contact header of the REGISTER request is stored as registration data at S-CSCF and a link to the data structure containing the stored Contact header is added to filter criteria. The filter criteria then comprises:

CASE method="INVITE" AND header="Accept-Contact"="+g.poc.talkburst" AND '+g.poc.talkburst' is included in &LINK (data structure containing the stored content of Contact header of REGISTER request) THEN ROUTE request to the specified PoC Server Terminating Port 3. At registration of a user equipment, the filter criteria are edited to contain terminal capabilities. For example, the content of the Contact header of the REGISTER request is stored as registration data at S-CSCF and a reference to the address where the Contact header is stored is added to filter criteria. The filter criteria then comprises:

CASE method="INVITE" AND header="Accept-Contact"="+g.poc.talkburst" AND '+g.poc.talkburst' is included in &REFERENCE (stored content of Contact header of REGISTER request) THEN ROUTE request to the specified PoC Server Terminating Port 4. Filter criteria are not edited during the registration, but contain a static reference to stored terminal capabilities. For example, the content of the Contact header of the REGISTER request may be stored to a place or address referred to in the filter criteria with &REFERENCE456. The filter criteria then comprises:

CASE method="INVITE" AND header="Accept-Contact"="+g.poc.talkburst" AND '+g.poc.talkburst' is included in &REFERENCE456 THEN ROUTE request to the specified PoC Server Terminating Port 5. Filter criteria are not edited during the registration, but the terminal capabilities are stored at the registration. For example, the REGISTER request or only the content of the Contact header of the REGISTER request may be stored in S-CSCF. A table of conditions for routing to AS is adjusted to comprise:
AS-poc; "required terminal capabilities"='+g.poc.talkburst'
A table of conditions for routing to AS may be loaded as configuration data, for example, at S-CSCF startup or when needed, from a local or common database, server, file, table or alike.
An alternative example of organizing the table:
"terminal capabilities"='+g.poc.talkburst'; allow routing to AS-poc 6. Filter criteria are not edited during the registration, but the terminal capabilities are stored at the registration. For example, the REGISTER request or only the content of the Contact header of the REGISTER request is stored in S-CSCF. System filter criteria used to check routing to AS is arranged to comprise:
CASE method="INVITE" AND header="Accept-Contact"="+g.poc.talkburst" AND "terminal capabilities"='+g.poc.talkburst' THEN ROUTE request to the specified PoC Server Terminating Port The procedure for checking whether a request should or should not be routed to the service platform may comprise any of the above alternatives or a combination derivative from them even if not explicitly mentioned in this list of examples.

The term application server (AS) corresponds herein to an external service platform for an application providing a service. In the previous embodiments, an external PoC AS is used to illustrate functions of a service platform providing PoC service. However, the service platform may be kind of service platform of any application, internal or external to the service control element implementing the control function. Additionally, the application server may be located in the same or in a different network, subnetwork, or domain as the service control element implementing the control function.

Figure 8:
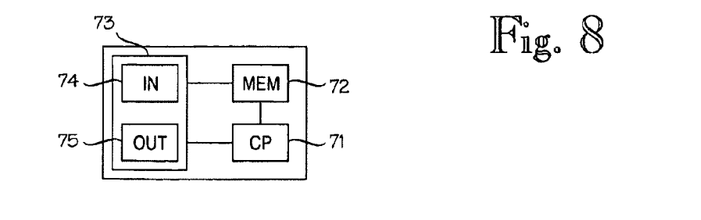
FIG. 8 illustrates the functional architecture of a service control element.

FIG. 8 illustrates the functional architecture of a service control element according to the invention. A Service control element relates to a network element that comprises processing means 81, an element that comprises an arithmetic logic unit, a number of special registers and control circuits. Connected to the processing means are memory means 82, a data medium where computer-readable data or programs or user data can be stored. The memory means typically comprise memory units that allow both reading and writing (RAM), and a memory whose contents can only be read (ROM). The unit also comprises an interface block 83 with input means 84 for inputting data for internal processing in the unit, and output means 85 for outputting data from the internal processes of the unit. Examples of said input means comprise a plug-in unit acting as a gateway for information delivered to its external connection points. For receiving information on the operator of the service control element, the element may also comprise a keypad, or a touch screen, a microphone, or the like. Examples of said output means include a plug-in unit feeding information to the lines connected to its external connection points. For outputting information to the operator of the service control element, they may also comprise a screen, a touch screen, a loudspeaker, or the like. The processing means 81, memory means 82, and interface block 83 are electrically interconnected for performing systematic execution of operations on the received and/or stored data according to the predefined, essentially programmed processes of the unit.

In the earlier described embodiment, the operations comprise a functionality for implementing the steps of service control as described above. The memory means 82 are arranged to store the user filter criteria in the element, at least during the time the service control element processes a request associated with the user. When such a request is received to the service control element through the input means 84, the user filter criteria is retrieved from the memory means 82, and compared against the data included in the request. If the conditions of the filter criteria are met, the request is forwarded to a defined AS through the output means 85. According to the invention, the filter criteria of the user is arranged to allow checking of the dynamic capability of the associated user to utilize the service provided by the application server.

As established above, the terminal capability reflects the ability of the terminal to generate or process a particular type of message content. For a person skilled in the art it is clear that such ability may be inherent or deliberately arranged, in order to provide the user a possibility to temporarily enable or disable some application services.

Transfer of the capability information may be arranged in several ways familiar to a person skilled in the art. For example, user equipment capability may be indicated with the mechanism described in IETF RFC3840, and/or via a web page, and/or via an Ut interface between a user equipment and a SIP application server, and/or via configuring the user subscription and/or service profile, and/or via agreement, and/or via communication between user equipment and network element, and/or via any mechanism and/or procedure involving any of the following: a user, an operator, and/or an automated (for example programmed) procedure. When considering the capability information several issues may impact on the parameters related to the capability information and how they can be transferred, e.g. media type (e.g. speech, audio, video, text), bearer type (e.g. real time, non real time, CS bearer, PS bearer), access type (e.g. cellular, MAN, fixed broadband xDSL, ... ) and any other parameters (e.g. multimedia messaging) and/or conditions and/or procedures and/or alike.

As a further example of the above mechanisms, in the following is given a more detailed example of a table of conditions for a service control element defining principles governing routing to AS. The example is presented for the described embodiment concerning PoC service.

| AS | Required capabilities |
|---|---|
| PoC AS | '+g.poc.talkburst' or '+g.poc.groupad' |
| News server | — |
| Games server | 'video' |

The exemplary table defines that a request is routed from the service control element to the PoC AS if at least one of the registered user equipments has a capability '+g.poc.talkburst' or '+g.poc.groupad'. This means that such user equipment is capable of receiving PoC requests and its user is willing to receive PoC Group Advertisements.

Another example of a table of conditions for a service control element defining routing principles to AS shows as:

| Public User Identity | User equipment | Forwarding to the following application servers is allowed |
|---|---|---|
| userB@example.com | UE-$1_B$ | PoC AS, News server |
| userB@example.com | UE-$2_B$ | News server, Games server |

When a user B makes a registration with a first user equipment UE-$1_B$, the items in the first line of the above table, i.e. the Public User Identity and the user equipment (referred e.g. with IP-address) are adopted from the registration information and stored in the first and second column of the table (see above). The system also extracts the capability information of the user equipment, determines the application servers that may be visited with the indicated capabilities, and inserts the names and/or addresses of the servers to the third column of the table. According to the invention, the table may then be used for checking whether a request targeted to the Public User Identity (userB@example.com) will be forwarded to AS e.g. PoC AS.

As illustrated in the above table, a user may register a Public User Identity via several different user equipment, and these user equipment may further be registered with different capabilities. For example, in the above example, a Public User Identity userB@example.com may register another user equipment UE-$2_B$, and UE-$1_B$ and UE-$2_B$ may have different capabilities. In such case S-CSCF checks that at least one of the user equipments has the required capabilities.

Figure 9:
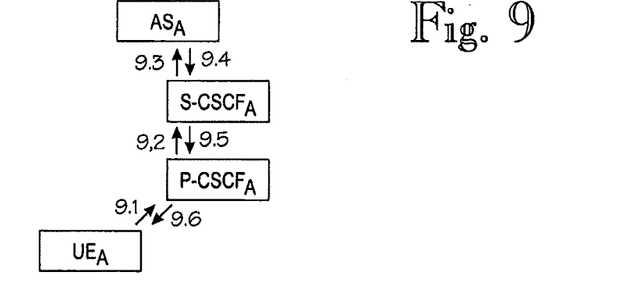
FIG. 9 shows a signalling block chart when an originating user equipment has re-registered to IMS without including a capability indication corresponding to the service.
Figure 10:
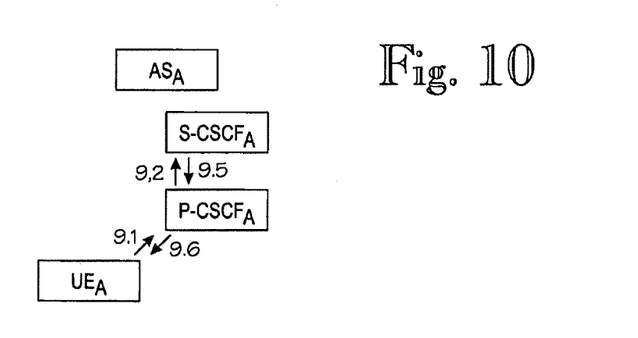
FIG. 10 illustrates the procedure of FIG. 9 improved with the invented solution.

In the described embodiment the service profile has been associated with IMS subscription of the terminating user. According to the nature of the session request, the service profile and the dynamic capabilities may be checked in respect of the originating user. This is illustrated in FIG. 9, where steps of a session setup of an originating user equipment UE$_A$ is shown. In the example the user of user equipment UE$_A$ wishes to contact a movie service platform AS$_A$ in order to watch a film. The user has registered via the user equipment UE$_A$, but has not included a capability information element that indicates adequate media capabilities. In step 9.1 UE$_A$ sends an INVITE request addressed to AS$_A$, and as in the procedure of FIG. 2, the request is forwarded (step 9.2) from the Proxy-Call Session Control Function (P-CSCF$_A$) to the Serving Call Session Control Function (S-CSCF$_A$) of the home network of user A. S-CSCF$_A$ implements the appropriate service logic and forwards the request to the movie server AS$_A$. The movie server detects a mismatch between the capability of UE$_A$ but may already have processed the request and furthermore, may have generated an associated charging information related to the download. It is also possible that the movie server does not detect the mismatch, but begins to implement the requested procedures and returns (step 9.4) and acknowledgement of the request to S-CSCF$_A$. When S-CSCF$_A$ detects the mismatch, it cancels the session setup and sends a notification the user equipment (step 9.6). However, at this stage the movie server may have already have generated both traffic and charging data related to the download operation. FIG. 10 illustrates the similar procedure enhanced with the present invention. In receiving the INVITE request, S-CSCF$_A$ retrieves the terminal capability information, and on the basis of it determines a mismatch between the requested service and the retrieved capability. S-CSCF$_A$ terminates the session setup and delivers (steps 9.5 and 9.6) a notification to the originating user equipment. The unnecessary traffic and charging operations are thus avoided.

To a person skilled in the art it is obvious that, as the technology advances, the inventive concept can be implemented in various ways. The invention and its embodiments are not limited to the examples described above but may vary within the scope of the claims.

The invention claimed is:

1. An apparatus, comprising:
   at least one processor;
   at least one memory, the at least one processor and the at least one memory configured to provide at least:
   an input unit configured to receive a session request identifying a user;
   a checker configured to check whether the session request matches a defined service control criterion, wherein the defined service control criterion comprises a capability information element of a terminal of the user;
   a router configured to forward the session request toward a defined service platform implementing a capability defined by the capability information element when the session request matches the defined service control criterion, wherein the forwarding is triggered by the match; and
   a retrieving unit configured to retrieve from a registration of the terminal, before forwarding the session request toward the defined service platform, the capability information element indicating the capability of the user to utilize a service provided by the defined service platform.

2. The apparatus of claim 1, wherein the apparatus provides a service control entity for enabling a multimedia session.

3. The apparatus of claim 1, wherein the session request is a session initiation protocol invite message.

4. The apparatus of claim 1, further comprising:
   an interface to a database configured to store one or more capability information elements received from one or more users.

5. The apparatus of claim 1, wherein the retrieving unit is configured to retrieve the capability information element from a database.

6. The apparatus of claim 1, wherein an initial filter criteria triggers the continuation of the session.

7. A method comprising:
   receiving a session request identifying a user;
   checking whether the session request matches a defined service control criterion, wherein the defined service control criterion comprises a capability information element of a terminal of the user;
   forwarding the session request toward a defined service platform implementing a capability defined by the capability information element, when the session request matches the defined service control criterion, wherein the forwarding is triggered by the match; and
   retrieving from a registration of the terminal, before forwarding the session request toward the defined service platform, the capability information element associated with the user, the capability information element indicating the capability of the user to utilize a service provided by the defined service platform.

8. The method of claim 7, further comprising:
   providing service control for enabling a multimedia session.

9. The method of claim 7, wherein the session request is a session initiation protocol invite message.

10. The method of claim 7, further comprising:
    accessing via an interface to a database one or more capability information elements received from one or more users.

11. The method of claim 7, further comprising:
    retrieving the capability information element from a database.

12. The method of claim 7, wherein the continuing is triggered based on an initial filter criteria.

13. A computer program embodied on a non-transitory computer readable storage medium, the computer program being configured to control a processor to perform operations comprising:

receiving a session request identifying a user;

checking whether the session request matches a defined service control criterion, wherein the defined service control criterion comprises a capability information element of a terminal of the user;

forwarding the session request toward a defined service platform implementing a capability defined by the capability information element, when the session request matches the defined service control criterion, wherein the forwarding is triggered by the match; and retrieving from a registration of the terminal, before forwarding the session request toward the defined service platform, the capability information element associated with the user, the capability information element indicating the capability of the user to utilize a service provided by the defined service platform.

14. The computer program embodied on the non-transitory computer readable storage medium of claim 13 further comprising:

providing service control for enabling a multimedia session.

15. The computer program embodied on the non-transitory computer readable storage medium of claim 13, wherein the session request is a session initiation protocol invite message.

16. The computer program embodied on the non-transitory computer readable storage medium of claim 13, further comprising:

accessing via an interface to a database one or more capability information elements received from one or more users.

17. The computer program embodied on the non-transitory computer readable storage medium of claim 13, further comprising:

retrieving the capability information element from a database.

18. The computer program embodied on the non-transitory computer readable storage medium of claim 13, wherein the continuing is triggered based on an initial filter criteria.

* * * * *